US010950062B2

(12) United States Patent
Tijink et al.

(10) Patent No.: US 10,950,062 B2
(45) Date of Patent: Mar. 16, 2021

(54) METHOD AND APPARATUS FOR TRUSTED RECORDING IN A ROAD TOLL SYSTEM

(71) Applicant: Kapsch TrafficCom AG, Vienna (AT)

(72) Inventors: Jasja Tijink, Breitenfurt (AT); Ulrik Janusson, Stockholm (SE)

(73) Assignee: Kapsch TrafficCom AG, Vienna (AT)

( * ) Notice: Subject to any disclaimer, the term of this patent is extended or adjusted under 35 U.S.C. 154(b) by 903 days.

(21) Appl. No.: 15/527,297

(22) PCT Filed: Sep. 9, 2015

(86) PCT No.: PCT/EP2015/070541
§ 371 (c)(1),
(2) Date: May 16, 2017

(87) PCT Pub. No.: WO2016/078789
PCT Pub. Date: May 26, 2016

(65) Prior Publication Data
US 2017/0323490 A1    Nov. 9, 2017

(30) Foreign Application Priority Data
Nov. 17, 2014 (EP) .................................. 14193479

(51) Int. Cl.
G07B 15/06 (2011.01)
H04L 9/32 (2006.01)

(52) U.S. Cl.
CPC .......... *G07B 15/063* (2013.01); *H04L 9/3247* (2013.01); *G06Q 2240/00* (2013.01)

(58) Field of Classification Search
CPC . G07B 15/063; H04L 9/3247; G06Q 2240/00
See application file for complete search history.

(56) References Cited

U.S. PATENT DOCUMENTS

| 6,098,048 A * | 8/2000 | Dashefsky | G06Q 30/02 |
| | | | 340/438 |
| 2007/0275731 A1* | 11/2007 | Alfert | G07B 15/02 |
| | | | 455/456.1 |

(Continued)

FOREIGN PATENT DOCUMENTS

| EP | 2423885 B1 | 10/2013 |
| WO | 2009/001303 A1 | 12/2008 |
| WO | 2016/078789 A1 | 5/2016 |

OTHER PUBLICATIONS

Barbeau, Sean J., A Location-Aware Architecture Supporting Intelligent Real-Time Mobile Applications, University of South Florida, 2012.*

(Continued)

*Primary Examiner* — Nathan Erb
(74) *Attorney, Agent, or Firm* — Fiala & Weaver P.L.L.C.

(57) ABSTRACT

A method for trusted recording in a road toll system, the road toll system having a proxy server connected via a mobile network to an onboard-unit of a vehicle, the onboard-unit having a position determination device, comprising: creating an itinerary record comprising a first or second position, a first or second point of time at least one of: a distance calculated using at least the first and second position, a segment-id, and a distance calculated using said segment-id; receiving and recording a signed itinerary record from the proxy server. In a further aspect of the embodiment an onboard-unit and a proxy server are provided for trusted recording in a road toll system.

20 Claims, 3 Drawing Sheets

(56) References Cited

U.S. PATENT DOCUMENTS

| | | | | |
|---|---|---|---|---|
| 2008/0126429 A1* | 5/2008 | Kalibjian | ................ | G06F 21/64 |
| 2010/0198665 A1* | 8/2010 | Daems | ................... | G07B 15/02 |
| | | | | 705/13 |
| 2012/0124384 A1* | 5/2012 | Livni | .................... | H04L 9/3247 |
| | | | | 713/178 |
| 2012/0209776 A1* | 8/2012 | Nagy | .................... | G06Q 50/30 |
| | | | | 705/50 |
| 2012/0324230 A1* | 12/2012 | Osborne | .............. | H04L 9/3247 |
| | | | | 713/176 |
| 2015/0262170 A1* | 9/2015 | Bouda | .................... | G06F 21/44 |
| | | | | 705/67 |

OTHER PUBLICATIONS

First Office Action Received for EP Patent Application No. 14193479. 4, dated Apr. 24, 2018, 5 pages.

Extended European Search Report Received for EP Patent Application No. 14193479.4, dated May 28, 2015, 6 pages.

International Preliminary Report on Patentability received for PCT Patent Application No. PCT/EP2015/070541, filed Sep. 9, 2015, 18 pages.

International Search Report and Written Opinion received for PCT Patent Application No. PCT/EP2015/070541, dated Oct. 29, 2015, 9 pages.

* cited by examiner

METHOD AND APPARATUS FOR TRUSTED RECORDING IN A ROAD TOLL SYSTEM

CROSS-REFERENCE TO RELATED APPLICATION(S)

This application is a U.S. national phase of International Application No. PCT/EP2015/070541 filed Sep. 9, 2015, which designated the U.S. and claims priority to European Patent Application No. 14 193 479.4, filed on Nov. 17, 2014, the disclosures of which are herein incorporated by reference in their entireties.

BACKGROUND

Technical Field

The present application relates to a method for trusted recording in a road toll system having a proxy server connected via a mobile network to an onboard-unit (OBU) of a vehicle, the onboard-unit having a position determination device for determining a current position of the vehicle. The application further relates to an onboard-unit and a proxy server.

Background Art

In modern road toll systems onboard-units can determine their position independently and can create so-called itinerary records according to the standard CEN TS 16702-1, comprising the position and time at the end of its acquisition and the distance driven since creating a last itinerary record or alternatively the section id of the current section. To face the threat that itinerary records are compromised in the onboard-unit by tampering or fraudulent attacks, secure monitoring concepts are implemented in the road toll system: Thereby, the OBUs are equipped with a so-called trusted recorder certified by the toll operator by means of which itinerary records can be cryptographically signed ("frozen"), which process is also referred to as trusted recording.

An onboard unit with an integrated trusted element is shown, for example, in EP 2 423 885 B 1. In one embodiment, the onboard-unit creates signed itinerary records by feeding raw position data to a trusted element of the onboard-unit, which is then checked for plausibility by means of map-matched data, which is obtained from a proxy server. If the toll operator wants to check the correct function of an OBU carried by a vehicle in the road toll system, the frozen records are read out, e.g. in spot checks, by an enforcement terminal and checked for plausibility. In another embodiment, the onboard-unit sends raw position fixes to a proxy server, as well as data-reduced position fixes, which can be signed by a trusted element in the onboard-unit. The raw and reduced position fixes are furthermore checked for plausibility and signed afterwards in the proxy server to create the signed itinerary records, which are then only available in the proxy server.

However, since trusted recorders have to be built so as to be proof against compromising, OBUs for a road toll system in which trusted recording is conducted are complicated to assemble and more expensive in manufacturing.

BRIEF SUMMARY

An aim of the present application is to provide methods and apparatus for trusted recording which overcome the above-mentioned drawbacks of the state of the art.

To this end, in a first aspect an embodiment provides for a method for trusted recording in a road toll system, the road toll system having a proxy server connected via a mobile network to an onboard-unit of a vehicle, the onboard-unit having a position determination device for determining a current position of the vehicle, comprising the following steps performed in the onboard-unit:

determining a first position by means of the position determination device at a first point of time and a second position by means of the position determination device at a second point of time;

creating an itinerary record comprising the first or second position, the first or second point of time and at least one of: a distance calculated using at least the first and second position, a segment-id calculated using at least the first or second position, and a distance calculated using said segment-id;

sending the itinerary record via the mobile network to the proxy server;

receiving a signed itinerary record from the proxy server, and recording said signed itinerary record in a memory of the onboard-unit.

In this way, the OBUs and the proxy server cooperate to implement a novel distributed trusted recorder functionality for secure monitoring. The embodiment provides for a remote proxy server in which a single trusted element can sign itinerary records for a multitude of OBUs according to the trusted standards of the toll operator. The OBUs used in such road toll systems with secure monitoring are thus simple to assemble and easy to manufacture. Furthermore, existing road toll systems without secure monitoring can easily be retrofitted to support secure monitoring since this only requires the installation of a proxy server with a trusted element as provided by the toll operator.

Since the OBUs do not require a built-in trusted recorder for secure recording, it is possible that conventional mobile phones, e.g. equipped with a DSRC (dedicated short range communication) interface for communication with an enforcement terminal, can be used as OBUs which support secure monitoring.

The method may comprise the step of signing the itinerary record in a trusted element of the proxy server with a digital signature. This allows a simple implementation of the signing process, since signing data with digital signatures by means of, e.g., public/private key schemes is readily available to the skilled person. It is advantageous if the signature comprises a sequential identifier, e.g. a counter, so that the signed itinerary records can be put in order by the OBU or an enforcement terminal requesting one or more signed itinerary records. A deletion of signed ("frozen") records can thus be detected by an enforcer since successively read-out frozen itinerary records will not have sequential signatures anymore.

In an embodiment, the onboard-unit sends the signed itinerary record to an enforcement terminal which checks said signed itinerary record for plausibility. This allows enforcement terminals in the road toll system to read out signed itinerary records of OBUs to check if the road driven by the vehicle has been declared for tolling as it was supposed to. Fraud can so effectively be reduced, since the OBUs can be supervised, e.g. in spot checks by passing enforcement terminals of the toll operator. Plausibility tests can be devised, e.g. by checking for sequentially of the identifiers, by checking if the last road section declared for toll by means of the itinerary record lies in a vicinity of the enforcement terminal, and/or by checking if the time of the last signed itinerary record is close to a present time, and so forth.

In the above-mentioned method for secure monitoring a certain latency time may occur between the creation of the itinerary record and the reception of the signed itinerary record in the OBU. This has an impact for enforcement terminals reading out signed itinerary records from the OBU because the most recent "unsigned" itinerary record will not always be ready as a signed itinerary record for the enforcement terminal to be read-out. It is a further object of the application to provide an improved method for secure monitoring which addresses this problem, too.

To achieve this further object, the following steps are performed in the onboard-unit after determining the first position and before determining the second position:

creating a partial itinerary record comprising at least one of the first position and the first point in time;

sending the partial itinerary record from the onboard-unit to the proxy server;

receiving a signed partial itinerary record via the mobile network from the proxy server; and recording said signed partial itinerary record in a memory of the onboard-unit.

The embodiment thus provides for novel "reduced" or "partial" itinerary records which are already created at a time when a section to be declared for tolling has started without the need to gather information about the whole section. It is in turn possible for an enforcement unit to obtain information about the declaration of a section to be tolled soon after the vehicle has entered such a section. In this case, the signed partial record is available in the OBU right after the start of a section, only delayed by an internal calculation time (taken in the OBU to create the partial itinerary record) and a latency time (taken to send, sign and receive the partial itinerary record from the proxy server), which are both smaller than the corresponding internal calculation time and latency time for a "complete" itinerary record: The internal calculation time is reduced since no distance has to be calculated and the latency time is reduced because of the reduced file size due to a reduced encryption ("signing") time in the proxy server.

The method may comprise the step of signing the partial itinerary record in a trusted element of the proxy server with a digital signature, the signature may comprise a sequential identifier. Further, the onboard-unit may send the signed partial itinerary record to an enforcement terminal which checks said signed partial itinerary record for plausibility. The same advantages and arguments hold as for the signing and sending of the complete itinerary record.

In one embodiment, the partial itinerary record may comprise only the first position and/or the first point in time, i.e. no calculated distance. On the other hand, the partial itinerary record may further comprise data of at least one previously recorded signed or unsigned itinerary record and/or at least one previously signed or unsigned partial itinerary record. This is especially useful for enforcement terminals to check the partial itinerary record for plausibility. The data further comprised in the partial itinerary record could be at least one previous position, time or distance.

In a further embodiment, the enforcement terminal checks if the identifier of the signed itinerary record and the identifier of the signed partial itinerary record are in a predetermined sequential relationship. Thereby the enforcement terminal can check if the OBU is following the procedure of correctly declaring the start of a road section to be tolled and then correctly declaring the full section driven.

To achieve a cross-checking with itinerary records as provided to the toll operator, the enforcement terminal may compare the signed itinerary record to a signed itinerary record received from the proxy or a central station to which said signed itinerary record had been forwarded by the proxy server. This ensures that the OBU cannot delete unwanted records or deceive the enforcement terminal by providing it with false data.

The position determination device of the OBU could be implemented in different forms, e.g. as an inertial navigation system (dead reckoning system), an optical recognition system detecting visual landmarks, etc. However, the position determination device may be a GNSS (global navigation satellite system) receiver. On the one hand, this has the advantage of a high accuracy while determining the position. On the other hand, it is also possible to obtain a very precise time information from the satellite system. Thus, a GNSS unit may be used as a time determination device and coupled to the processor. Alternatively an internal or external clock of the processor of the OBU could be used as a time determination device.

In a second aspect of the embodiment, there is provided an OBU for mounting on a vehicle in a road toll system, the OBU comprising:

a position determination device for determining a current position of the vehicle;

a memory;

a transceiver for communication with a proxy server via a mobile network; and a processor coupled to the memory, the position determination device and the transceiver;

wherein the processor is configured to determine a first position by means of the position determination device at a first point of time and a second position by means of the position determination device at a second point of time, create an itinerary record comprising the first or second position, the first or second point of time and at least one of: a distance calculated using at least the first and second position, a segment-id calculated using at least the first or second position, and a distance calculated using said segment-id, send the itinerary record via the transceiver to the proxy server, receive a signed itinerary record from the proxy server via the transceiver, and record said signed itinerary record in the memory.

The processor of the OBU is further configured to, after determining the first position and before receiving the second position, create a partial itinerary record comprising at least one of the first position and the first point in time, send the partial itinerary record from the onboard-unit to the proxy server via the transceiver, receive a signed partial itinerary record from the proxy server via the transceiver, and record said signed partial itinerary record in the memory.

Further, there may be provided a further transceiver, which may be a DSRC transceiver, for communication with an enforcement terminal, wherein the processor of the OBU is configured to send the signed itinerary record to an enforcement terminal via the further transceiver.

In a third aspect of the embodiment, there is provided a proxy server for a road toll system, the proxy server comprising a transceiver for communication via a mobile network with an OBU carried by a vehicle;

a trusted element; and a processor coupled to the transceiver and the trusted element; wherein the processor is configured to receive, via the transceiver, an itinerary record comprising a first or second position, a first or second point in time and a distance based on at least the first and second position from the OBU, let the received itinerary record have signed by the trusted element with a digital signature, and send the signed itinerary record from the proxy server via the transceiver to the OBU.

The processor of the proxy server may be further configured to receive a partial itinerary record comprising at least one of the first position and the first point in time from the onboard-unit via the transceiver, let the received itinerary record have signed by the trusted element with a digital signature, and send the signed partial itinerary record from the proxy server via the transceiver to the onboard-unit.

As to the advantages and further features of the OBU and proxy server of the embodiment, reference is made to the arguments detailed for the method embodiments which apply mutatis mutandis.

BRIEF DESCRIPTION OF THE DRAWINGS/FIGURES

The method and apparatus shall now be explained in more detail below on the basis of exemplary embodiments thereof with reference to the accompanying drawings, in which.

DETAILED DESCRIPTION

Figure 1:
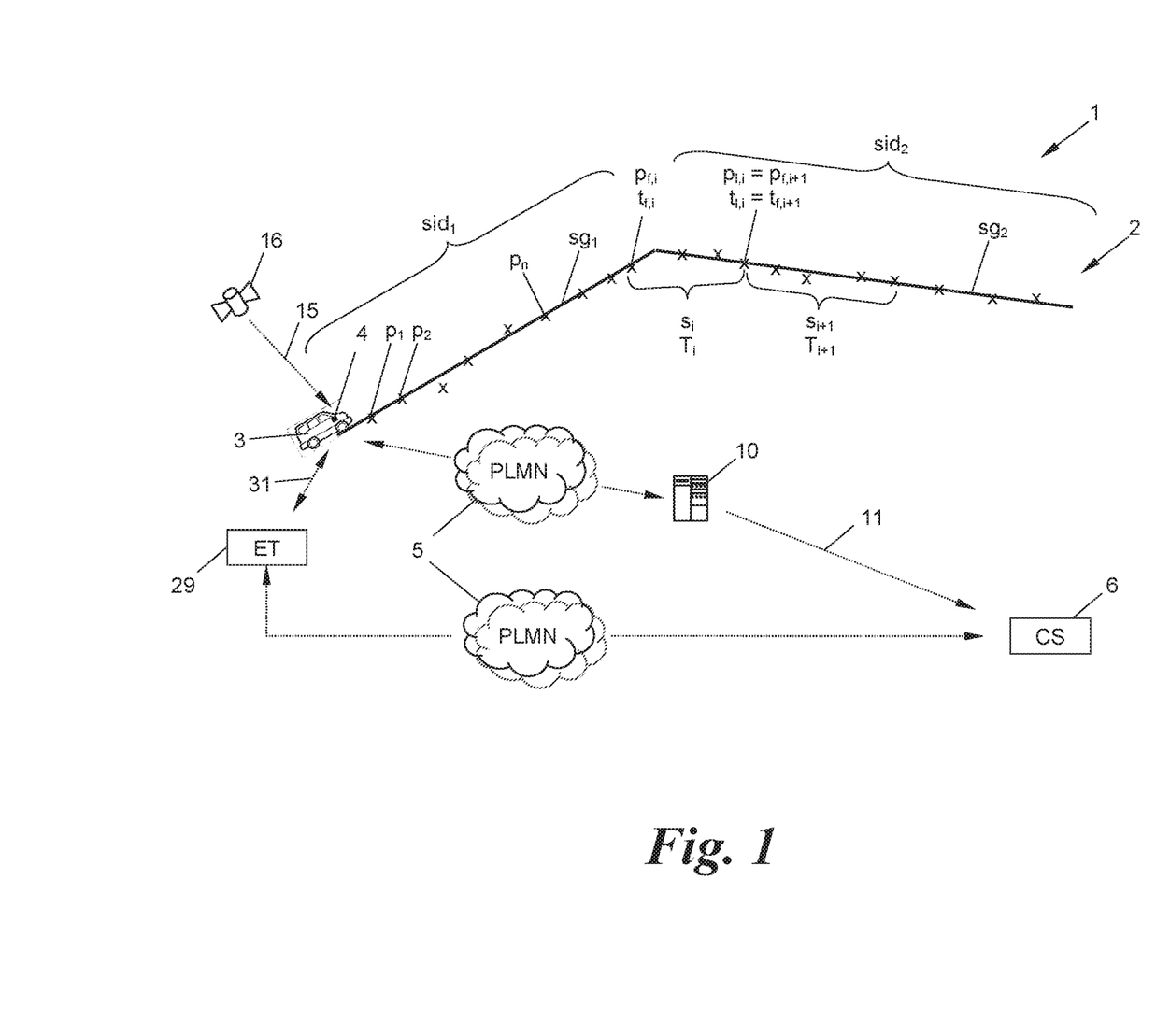
FIG. 1 shows a schematic overview of a road toll system with components according to an embodiment.

FIG. 1 shows a road toll system 1 with a road 2 on which a vehicle 3 carrying an onboard-unit (OBU) 4 travels. Vehicles 3 in the road toll system 1 are required to determine their own positions and distances traveled on the roads 2 and to submit this information via a mobile network 5 such as a public land mobile network (PLMN), e.g., GSM, UMTS, LTE, or another 3G/4G/5G network, to a central station 6 for billing, registration, etc.

To transmit data to the central station 6, the OBU 4 is equipped with a processor 7 (FIG. 2) coupled to a transceiver 8 (with antenna 9) which works according to the standard used in the mobile network 5, e.g., GSM, UMTS, LTE, etc. The transceiver 8 sends data to be transmitted via the mobile network 5 either directly to the central station 6 or to a proxy server 10 which—according to one of its features—forwards the received data via a data network 11, such as the Internet, to the central station 6. To this end, the proxy server 10 is also equipped with a transceiver 12 (with antenna 13) which works according to the standard used in the mobile network 5.

To gather information about its current position and distance travelled, the OBU 4 comprises a position determination device 14. In the embodiments shown in FIGS. 1 and 2, a global navigation satellite system (GNSS) receiver is used as position determination device 14 by way of which the OBU 4 receives navigation signals 15 of a GNSS 16 such as GPS, GLONASS, GALILEO or the like, and based thereon successively generates readings of its own current position ("position fixes") $p_1, p_2, \ldots$, generally $p_n$, at successive points of time $t_1, t_2, \ldots$, generally $t_n$, which are determined by a time determination device such as the GNSS receiver 14 itself, the processor 7, or a separate clock. Alternatively, the OBU 4 could also determine the current positions in another manner, for example by way of an inertial measurement or dead reckoning system, optical (visual) recognition of landmarks, or by radio triangulation or cell identifier evaluation in the mobile network 5 or a network of radio beacons, e.g., DSRC beacons.

Figure 2:
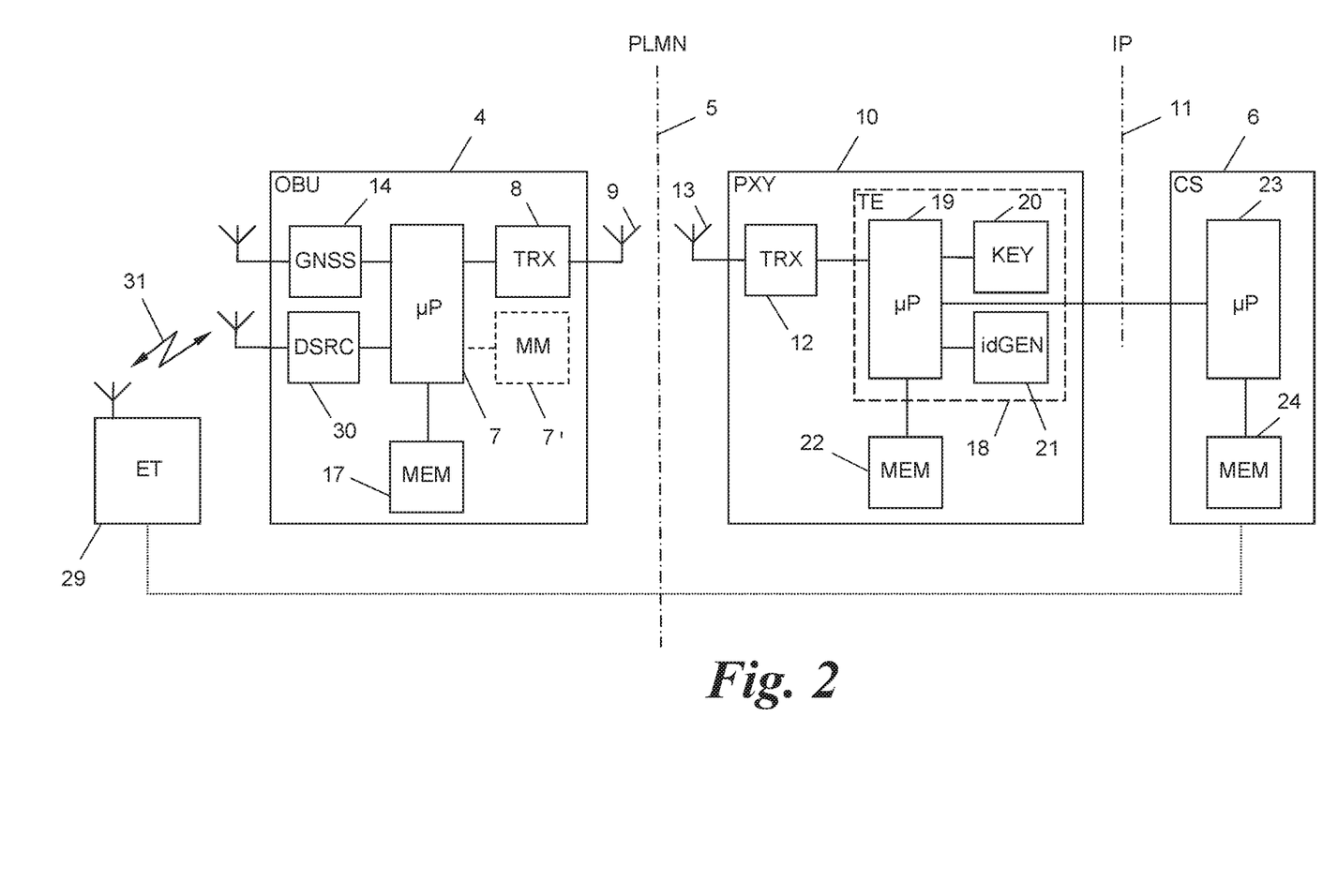
FIG. 2 shows a block diagram of the components of the road toll system of FIG. 1.

By means of the position determination device 14, the OBU 4 gathers a set of current positions $\{p_n\}_i$, (i=1, 2, . . . ) over a time interval $T_i$ with a predetermined length which in turn defines a section $s_i$ of the road 2 on which the vehicle 3 has travelled during the time interval $T_i$. Each time interval $T_i$ can be defined by its first point of time $t_{f,i}$ and its last point of time The set of current positions $\{p_n\}_i$ gathered on the section $s_i$ can be summarised by the first position $p_{f,i}$ or the last position $p_{l,i}$ therein and a—roughly approximated or precisely calculated—distance $d_i$ spanned by the set of current positions $\{p_n\}_i$ reflecting—approximately or precisely—the distance travelled by the vehicle 3 in the section $s_i$.

To report its way travelled to the central station 6 in an efficient manner, the OBU 4 creates a so-called itinerary record $RC_i$ for the section $s_i$. According to the standard CEN TS 16702-1, such itinerary records comprise the last position of a section $s_i$, the last point of time $t_{l,i}$ of the section $s_i$, and the distance $d_i$ travelled within the section $s_i$, although different representations of the section $s_i$ may be chosen such as, for example, the first position $p_{f,i}$ first point of time $t_{f,i}$ and distance $d_i$, or the first and last positions $p_{f,i}, p_{l,i}$ (without time and distance) and/or some of the other current positions $p_n$ of the set of current positions $\{p_n\}_i$ gathered over the section $s_i$, etc. The OBU 4 is further equipped with a memory 17 to temporarily or permanently store gathered positions $p_n$, position sets $\{p_n\}_i$, itinerary records $RC_i$, etc.

Instead of the distance $d_i$ driven on the section $s_i$, the itinerary record $RC_i$ can comprise a segment-id $sid_m$ (m=1, 2, . . . ). The segment-id $sid_m$ is usually different from the section $s_i$, since segment-ids $sid_m$ correspond to predetermined road segments $sg_1, sg_2, \ldots sg_m, \ldots$ of the road 2, as e.g. defined in a map matcher 7' of the OBU 4 or an external map matcher. When creating an itinerary record $RC_i$ at the end of a section $s_i$, the OBU 4 can thus retrieve a segment-id $sid_m$ from the internal map matcher 7' (or an external map matcher) corresponding to any one (or a plurality) of the positions $p_n$ of the set of current positions $\{p_n\}_i$, for example, the first position $p_{f,i}$ or the last position $p_{l,i}$ of a section $s_i$, which falls into the road segment $sg_m$.

After the time-interval $T_i$ has finished, the OBU 4 gathers a next set of current positions $\{p_n\}_{i+1}$ over a next time interval $T_{i+1}$, wherein the last point of time $t_{l,i}$ of the previous interval may coincide with the first point of time $t_{f,i+1}$ of the new interval, and thus the last position $p_{l,i}$ of the previous set of current positions $\{p_n\}_i$ may coincide with the first position $p_{f,i+1}$ of the new set of current positions $\{p_n\}_{i+1}$. Thus, time intervals $T_i, T_{i+1}, \ldots$, succeed each other to define sections $s_i, s_{i+1}, \ldots$, with sets of current positions $\{p_n\}_i$, $\{p_n\}_{i+1}, \ldots$. The time intervals $T_i$, $T_{i+1}, \ldots$, have the same timely length and are thus periodic, although this is not compulsory.

To implement secure monitoring in the road toll system 1, a trusted element 18 is installed in the proxy server 10, i.e. coupled to the transceiver 12 of the proxy server 10. The trusted element 18 is tamper-proof and comprises a processor 19, an encryption unit 20, and an (optional) id-generator 21; a detailed explanation about the functions of said elements will be given below. To temporarily or permanently store incoming or outgoing data for monitoring purposes, a memory 22 is coupled to the processor 18.

For purposes mentioned above, the proxy server 10 is connected to the central station 6 via the network 11, and the central station 6 is equipped with a processor 23 and a memory 24 for storing data as forwarded by the proxy server 10.

Figure 3:
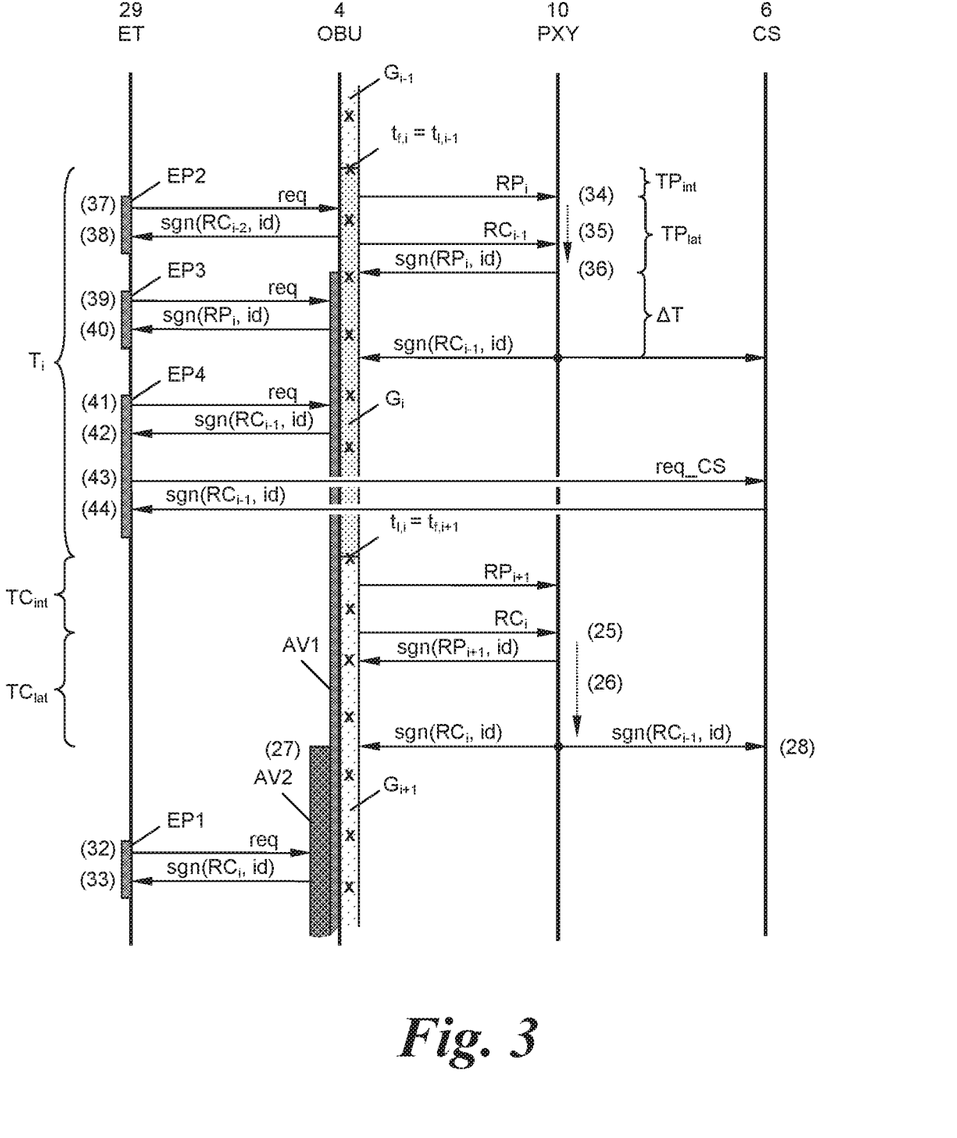
FIG. 3 shows the method of an embodiment in the form of a sequence diagram.

It is now referred to FIG. 3 for the method of secure monitoring in the road toll system 1, where a gathering process $G_i$ is executed within the time interval $T_i$ to gather current positions $p_n$. At the end of the gathering process $G_i$, i.e. at the last point of time $t_{l,i}$, internal processes in the OBU 4 take place over a time interval $TC_{int}$ to create the itinerary record $RC_i$. This takes a certain amount of time since especially the calculation of the distance $d_i$ is to be calculated in order to create the itinerary record $RC_i$.

The calculation of the distance $d_i$ by means of the gathered set of current positions $\{p_n\}_i$ can be done in any manner known to the skilled person, e.g. by calculating the distance between adjacent positions $p_n$ or by spline techniques. Alternatively, the distance $d_i$ could also be obtained by map matching by means of the Map Matcher 7' of the OBU 4, using the first and last position $p_{f,i}$, $p_{l,i}$ or the segment-id sid, or by means of an external map matcher, e.g. in the proxy server 10. When external map matchers are used, however, the "internal" calculation interval $TC_{int}$ increases significantly.

After the itinerary record $RC_i$ has been created, i.e. after the internal calculation interval $TC_{int}$, the itinerary record $RC_i$ is sent to the proxy server 10 in step 25, where it is received with a delay according to the latency of the mobile network 5.

In step 26, the itinerary record $RC_i$ is signed in the trusted element 18 of the proxy server 10 by means of the encryption unit 20, e.g., according to a public/private-key scheme, to obtain a signed itinerary record sgn($RC_i$).

Step 26 of signing the itinerary record $RC_i$ may further comprise the attachment of an identification id to the record by means of the id-generator 21 to obtain a signed itinerary record sgn($RC_i$,id). The identification id may be signed too, such that it cannot be forged by the OBU 4 or a third party. The id-generator 21 may act as a counter, such that all identifications id are sequential and unique.

In step 27, the signed itinerary record sgn($RC_i$,id) is sent back to the OBU 4 where it is stored in the memory 17 of the OBU 4. Since there is now a signed itinerary record sgn($RC_i$,id) present in the OBU 4, it is not mandatory to forward the signed itinerary record sgn($RC_i$,id) to the central station 6, since the signed itinerary records sgn($RC_i$,id) could be read out from the OBU 4 in a "back office" manner for calculating the toll after a trip by the vehicle 3 in the road toll system 1. However, the proxy server 10 may forward the signed itinerary record sgn($RC_i$,id) in step 28 to the central station 6 for evaluation, calculation of charges, etc., where the signed itinerary record sgn($RC_i$,id) is processed by the processor 23 and stored in the memory 24 of the central station 6. Alternatively or additionally, the signed itinerary record sgn($RC_i$,id) could also be stored in the memory 22 of the proxy server 10.

Optionally, the unsigned itinerary records $RC_i$ could also be forwarded to the central station 6 or stored in the memory 22 for crosschecking with the signed itinerary records sgn($RC_i$,id).

The signed itinerary record sgn($RC_i$,id) is received in the OBU 4 after an interval $TC_{lat}$ comprising network latencies and the processing time in the proxy server 10, i.e. in total at a time $TC_{int}+TC_{lat}$ after the last point of time $t_{l,i}$.

Thus, it can be seen that it takes a significant amount of time to gather current positions $p_n$, create the itinerary record $RC_i$ and receive the signed itinerary record $RC_i$, namely the time $$T_i + TC_{int} + TC_{lat}$$

To check if the OBUs 4 in the road toll system 1 work properly and declare their toll by means of signed itinerary records sgn($RC_i$,id), an enforcement system is in place which uses enforcement terminals 29 to check if the OBUs 4 declare their toll properly. The enforcement terminals 29 can be used on vehicles patrolling on the road 3, for example, travelling in the same direction as the vehicles 3 carrying OBUs 4, or the enforcement terminals 29 can be roadside beacons interacting with the OBUs 4.

To this end, the OBU 4 is equipped with a further transceiver 30 to establish a radio link 31 with an enforcement terminal 29 passing by. The transceiver 30, and therefore the radio link 31, has a radio range of at most a few metres, a few tens of metres or a few hundred metres, as is implemented for example by the DSRC (dedicated short range communication), CEN-DSRC, UNI-DSRC, IEEE 802.11p or WAVE (wireless access for vehicular environments) or ITS-G5 standards inclusive of WLAN and Wifi®, Bluetooth®, or active or passive RFID (radio frequency identification) technologies.

Alternatively, the enforcement terminal 29 can request the signed itinerary record sgn($RC_i$,id) from the OBU 4 via the mobile network 5 or via a public or private data channel, e.g. a virtual private network (VPN). In this embodiment, no DSRC communication means is necessary within the OBU 4, such that even a mobile phone can be used as an OBU 4 by means of suitable software implementations. To determine a match between OBU 4 and vehicle 3, the enforcement terminal 29 can in any case read the license plate number of the vehicle 3, e.g. by OCR-reading, and match the license plate number to a unique OBU-identification by means of a database.

To check the OBU 4, the enforcement terminal 29 conducts an enforcement process EP1, wherein in step 32 a request req is sent to the OBU 4 to obtain the most recent signed itinerary record(s) sgn($RC_i$,id). After receipt of the signed itinerary record(s) sgn($RC_i$,id) in step 33, the enforcement terminal 29 checks for plausibility of the received signed itinerary record(s) sgn($RC_i$,id). To this end, the enforcement terminal 29 can use a variety of verification schemes, each of which is optional: Firstly, the enforcement terminal 29 can check whether the signature is in fact valid. Secondly, the enforcement terminal 29 can check if the last position as stated in the signed itinerary record sgn($RC_i$,id) lies in the vicinity of the current position of the enforcement terminal. Additionally or alternatively, it is checked whether the last point of time lies in a vicinity of a momentary time.

A further verification scheme tests whether the identifications id of the at least two last received signed itinerary records sgn($RC_{i-1}$,id), sgn($RC_i$,id) are successive. This ensures that no signed itinerary records were discarded. Yet another verification scheme requests the signed itinerary record sgn($RC_i$,id) stored in the memory 22 of the proxy server 10 and/or stored in the memory 24 of the central station 6 and compares it with the signed itinerary record sgn($RC_i$,id) received from the OBU 4, as described later on for the exemplary enforcement process EP4.

As can be seen from FIG. 3, it takes a considerable amount of time for the signed itinerary record sgn($RC_i$,id) to be available in the OBU 4 for enforcement. Thus, a "partial" itinerary record RP comprising only the first position $p_{f,i}$ and/or the first point of time $t_{f,i}$, may be optionally introduced in a further embodiment of the method which is now explained in detail.

The method for signing the "complete" itinerary record $RC_i$ described holds for the partial itinerary record $RP_i$ as well, i.e. after creation, the partial itinerary record $RP_i$ is sent in step 34 to the proxy server 10 where it is signed by means of a digital signature (and an optional identification id) in step 35 to obtain a signed partial itinerary record sgn($RP_i$,id) which is sent back to the OBU 4 in step 36. Furthermore, all mentioned memories 17, 22, and 24 are also configured to store said partial itinerary records $RP_i$.

The partial itinerary record $RP_i$ is "partial" in so far as it does not comprise all current positions $\{p_n\}_i$ of a section $s_i$, but only some of the first or only the first current position $p_{f,i}$ of a section $s_i$, and hence does not comprise the distance $d_i$ driven over the section $s_i$. Creation of the partial itinerary record $RP_i$ can thus already be conducted at the beginning of the section $s_i$, reducing the time after which a record declaring the tolling of section $s_i$ is available in the OBU 4 by (at least) the amount $T_i$.

In particular, because no distance $d_i$ has to be calculated, the internal calculation time $TP_{int}$ in the OBU 4 may even be lower than the internal calculation time $TC_{int}$ for a complete itinerary record $RC_i$. Also due to the reduced file size and thereby reduced encryption time of the partial itinerary record $RP_i$ the latency time $TP_{lat}$ for partial itinerary records $RP_i$ is lower than the latency time $TC_{lat}$ for complete itinerary records $RP_i$. The total time saving of receiving a signed partial itinerary record sgn($RP_i$,id) with respect to the signed complete itinerary record sgn($RC_{i-1}$,id) as received from the preceding section $s_{i-1}$ is thus $\Delta T = TC_{int} + TC_{lat} - TP_{int} - TP_{lat}$.

Due to the above-mentioned time savings, the signed partial itinerary record sgn($RP_i$,id) may in fact be received even earlier than the signed itinerary record sgn($RC_{i-1}$,id) of the previous section $s_{i-1}$. If, in one embodiment of the method, the sequentially of the identifications id is considered when the enforcement terminal 29 checks for sequential identifiers id, two different id-generators 19 (counters) can be used for the partial and complete itinerary records $RP_i$, $RC_i$, respectively. Another solution would be to consider an expected relationship when checking for sequentially, e.g. the identifier id of the complete itinerary record sgn($RC_i$,id) is expected to be higher by three with respect to the identifier id of the partial itinerary record sgn($RP_i$,id) declaring the same section $s_i$.

Focus is now shifted towards the responses received at the enforcement terminal 29 upon requesting the OBU 4 to issue its last signed complete and/or partial itinerary record. To this end, further exemplary enforcement processes EP2, EP3, and EP4 are explained in the following.

For an enforcement process EP2 whose step 37 of sending a request req lies at a time $t_{ep2}$ with $$t_{f,i} < t_{ea2} < t_{f,i} + TP_{int} + TP_{lat},$$

the enforcement terminal 29 will receive in step 38 the signed complete itinerary record sgn($RC_{i-2}$,id) from the section $s_{i-2}$, i.e. the tolling information from two sections ago, and optionally the last signed itinerary record sgn($RP_{i-1}$,id). The enforcement terminal 29 can therefore conclude that the OBU 4 is either in the gathering process $G_{i-1}$ or has already finished the gathering process $G_{i-1}$ but not yet received the signed partial itinerary record sgn($RP_i$,id) from the proxy server 10.

For an enforcement process EP3 whose step 39 of sending a request req lies at a time $t_{ep3}$ with $$t_{f,i} + TP_{int} + TP_{lat} < t_{ep3} < t_{f,i} + TC_{int} + TC_{lat},$$

in which there is an availability AV1 of the signed partial itinerary record sgn($RP_i$,id) of the section $s_i$, the enforcement terminal 29 may receive in step 40 the signed partial itinerary record sgn($RP_i$,id) and optionally the signed complete itinerary record sgn($RC_{i-2}$,id), whereupon the enforcement terminal 29 can conclude that the section $s_i$ has been declared for toll, even though there is not even a signed complete record sgn($RC_{i-1}$,id) about the section $s_{i-1}$ present in the OBU 4.

Enforcement process EP4 shows in step 41 a request req at a time $t_{ep4}$ with $$t_{f,i} + TC_{int} + TC_{lat} < t_{ep4} < t_{f,i} + T_i,$$

in which there is an availability AV2 of the signed complete itinerary record sgn($RC_{i-1}$,id) of the section $s_{i-1}$, which is received in step 42. This enforcement action EP4 holds similarities to the enforcement action EP2: The enforcement terminal 29 can conclude that the OBU 4 is either in the gathering process $G_i$ or has already concluded the gathering process $G_i$ but not yet received the signed partial itinerary record sgn($RP_{i+1}$,id), but it knows for certain that the section $s_i$ will be declared due to the presence of the partial itinerary record sgn($RP_i$,id).

Furthermore, the enforcement process EP4 may send in step 43 a request req CS to the central station 6 to issue the last received partial and/or complete itinerary record in step 44, so that the enforcement terminal 29 can check the plausibility of the itinerary record(s) as received from the OBU 4 in step 42. This measure can also be taken for the enforcement processes EP1, EP2 and EP3.

All further schemes to check for plausibility as described above for the case of complete itinerary records sgn($RC_i$,id) can also be conducted for partial itinerary records sgn($RP_i$,id).

The present subject matter is not restricted to the specific embodiments described in detail herein, but encompasses all variants, combinations and modifications thereof that fall within the framework of the appended claims.

The invention claimed is:

1. A method for trusted recording in a road toll system, the road toll system having a proxy server connected via a mobile network to an onboard-unit of a vehicle, the onboard-unit having a position determination device for determining a current position of the vehicle, the onboard-unit having no trusted element, comprising the following steps performed in the onboard-unit:

determining a first position by means of the position determination device at a first point of time and a second position by means of the position determination device at a second point of time;

creating an itinerary record comprising the first or second position, the corresponding first or second point of time and at least one of: a distance calculated using at least the first and second position, a segment-id calculated using at least the first or second position, and a distance calculated using said segment-id;

sending the itinerary record via the mobile network to the proxy server;

signing the itinerary record in a trusted element of the proxy server with a digital signature;

receiving the signed itinerary record from the proxy server, and recording said signed itinerary record in a memory of the onboard-unit.

2. The method according to claim 1, wherein the signature comprises a sequential identifier.

3. The method according to claim 1, wherein the onboard-unit sends the signed itinerary record to an enforcement terminal which checks said signed itinerary record for plausibility.

4. The method according to claim 3, wherein the enforcement terminal compares the signed itinerary record to a signed itinerary record received from the proxy or a central station to which said signed itinerary record had been forwarded by the proxy server.

5. The method according to claim 1, wherein the following steps are performed in the onboard-unit after determining the first position and before determining the second position:

creating a partial itinerary record comprising at least one of the first position and the first point in time;

sending the partial itinerary record from the onboard-unit to the proxy server;

receiving a signed partial itinerary record via the mobile network from the proxy server; and recording said signed partial itinerary record in a memory of the onboard-unit.

6. The method according to claim 5, comprising the step of signing the partial itinerary record in a trusted element of the proxy server with a digital signature.

7. The method according to claim 6, wherein the signature comprises a sequential identifier.

8. The method according to claim 5, wherein the onboard-unit sends the signed partial itinerary record to an enforcement terminal, which checks said signed partial itinerary record for plausibility.

9. The method according to claim 8, wherein the onboard unit further sends the signed itinerary record to the enforcement terminal which checks the signed itinerary record for plausibility; and wherein the enforcement terminal checks if the identifier of the signed itinerary record and the identifier of the signed partial itinerary record are in a predetermined sequential relationship.

10. The method according to claim 9, wherein the enforcement terminal compares the signed itinerary record to a signed itinerary record received from the proxy or a central station to which said signed itinerary record had been forwarded by the proxy server.

11. The method according to claim 5, wherein the partial itinerary record further comprises data of at least one previously recorded signed or unsigned itinerary record and/or at least one previously signed or unsigned partial itinerary record.

12. The method according to claim 1, wherein the position determination device is a GNSS receiver.

13. An onboard-unit for mounting on a vehicle in a road toll system, the onboard-unit comprising:

a position determination device for determining a current position of the vehicle;

a memory;

a transceiver for communication with a proxy server via a mobile network; and a processor coupled to the memory, the position determination device and the transceiver;

the onboard-unit having no trusted element;

wherein the processor is configured to determine a first position by means of the position determination device at a first point of time and a second position by means of the position determination device at a second point of time, create an itinerary record comprising the first or second position, the corresponding first or second point of time and at least one of: a distance calculated using at least the first and second position, a segment-id calculated using at least the first or second position, and a distance calculated using said segment-id, send the itinerary record via the transceiver to the proxy server, receive the itinerary record signed from the proxy server via the transceiver, wherein the itinerary record was signed in a trusted element of the proxy server with a digital signature, and record said signed itinerary record in the memory.

14. The onboard-unit according to claim 13, wherein the processor is further configured to, after determining the first position and before receiving the second position, create a partial itinerary record comprising at least one of the first position and the first point in time, send the partial itinerary record from the onboard-unit to the proxy server via the transceiver, receive a signed partial itinerary record from the proxy server via the transceiver, and record said signed partial itinerary record in the memory.

15. The onboard-unit according to claim 13, comprising a further transceiver for communication with an enforcement terminal, wherein the processor is configured to send the signed itinerary record to the enforcement terminal via the further transceiver.

16. The onboard-unit according to claim 15, wherein the transceiver is a DSRC transceiver.

17. The onboard-unit according to claim 13, wherein the position determination device is a GNSS receiver.

18. A proxy server for a road toll system, the proxy server comprising a transceiver for communication via a mobile network with an onboard-unit carried by a vehicle;

a trusted element; and a processor coupled to the transceiver and the trusted element; wherein the processor is configured to receive, via the transceiver, an itinerary record comprising a first or second position, a corresponding first or second point in time and a distance based on at least the first and second position from the onboard-unit, let the received itinerary record have signed by the trusted element with a digital signature, and send the signed itinerary record from the proxy server via the transceiver to the onboard-unit.

19. The proxy server according to claim 18, wherein the processor is further configured to receive a partial itinerary record comprising at least one of the first position and the first point in time from the onboard-unit via the transceiver, let the received partial itinerary record have signed by the trusted element with a digital signature, and send the signed partial itinerary record from the proxy server via the transceiver to the onboard-unit.

20. The proxy server according to claim 18, wherein the signature comprises a sequential identifier.

* * * * *

UNITED STATES PATENT AND TRADEMARK OFFICE
CERTIFICATE OF CORRECTION

PATENT NO. : 10,950,062 B2
APPLICATION NO. : 15/527297
DATED : March 16, 2021
INVENTOR(S) : Jasja Tijink et al.

Page 1 of 1

It is certified that error appears in the above-identified patent and that said Letters Patent is hereby corrected as shown below:

In the Specification

In Column 6, Line 24, after "time" insert -- $t_{1,i}$. --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*